United States Patent
Blackwell et al.

[15] 3,656,991

[45] Apr. 18, 1972

[54] PROCESS OF TREATING WATER SWELLABLE CELLULOSIC MATERIALS

[72] Inventors: John Blackwell, Kennett Square, Pa.; William Henry Gumprecht, Wilmington, Del.; Roy Emerson Starn, Jr., West Chester, Pa.

[73] Assignee: E. I. du Pont de Nemours and Company, Wilmington, Del.

[22] Filed: Nov. 25, 1968

[21] Appl. No.: 778,761

[52] U.S. Cl............................117/33.3, 117/136, 117/137, 117/138.5, 117/143 R, 117/144, 117/63, 117/154, 117/138.8 F

[51] Int. Cl......................................C09k 3/28, D06m 7/00

[58] Field of Search................117/143 R, 138.5, 143, 33.3, 117/33.5 T, 136, 137, 143 I, 144.5, 56, 144, 143 B, 154, 63, 138.8 F; 260/29.2 EP; 252/DIG. 1; 8/131, 130.1, 132

[56] References Cited

UNITED STATES PATENTS 3,190,797 6/1965 Bindler et al....................117/138.5 X 3,265,463 8/1966 Barber et al.........................8/116.3 X

*Primary Examiner*—William D. Martin
*Assistant Examiner*—Harry J. Gwinnell
*Attorney*—Louis H. Rombach

[57] ABSTRACT

A process for treating water swellable cellulosic materials, or mixtures or blends thereof with synthetic materials, with preformed agents selected from flame retarding agents, biocides, ultraviolet light absorbing agents, fluorescent brighteners and water proofing agents to provide treated materials which are fast to aqueous washing and drycleaning, said process comprising contacting said cellulosic material in any sequence with water in an amount sufficient to swell the cellulose, at least an effective amount of a preformed treating agent of low water solubility and of the aforesaid type, and a solvent for said treating agent, said solvent being an ethylene glycol or a polyethylene glycol, e.g., diethylene glycol monomethyl ether; being at least partially miscible with water; having a boiling point above about 150° C. at atmospheric pressure; and being present in an amount sufficient to maintain swelling of the cellulose if the water is removed, provided that at some stage during the process the interior of the swollen cellulose is contacted with a solution of the treating agent in aqueous solvent or solvent.

25 Claims, No Drawings

PROCESS OF TREATING WATER SWELLABLE CELLULOSIC MATERIALS

BACKGROUND OF THE INVENTION

1. Field of the Invention

This invention is directed to a process for treating water swellable cellulosic materials, especially cellulosic fibers, either alone or in blends or mixtures with synthetic materials, especially synthetic fibers, with preformed agents selected from flame retarding agents, biocides, ultraviolet light absorbing agents, fluorescent brighteners and water proofing agents to provide treated materials which are fast to aqueous washing and drycleaning.

2. Description of the Prior Art

The prior art discloses a variety of techniques for treating cellulosic materials with flame retarding agents, biocides, ultraviolet light absorbing agents, fluorescent brighteners or water proofing agents. The techniques vary considerably because of marked differences in properties between the aforesaid agents. For example, because of wide solubility variations in water or in organic solvents, some of said agents are applied from aqueous solutions, some from solutions in organic solvents, and some from aqueous organic systems.

The prior art processes for applying flame retardants to cellulosic materials utilize treating agents which are either of water soluble, reactive types or water insoluble nonreactive types. With either type of treating agent a reactive resin usually is coapplied, either to react with both the cellulose and the water soluble, reactive treating agent, or to act as a binder to retain the water insoluble treating agent within or on the cellulosic material. Because of the heavy add-on of the resin, such prior art processes produce significant changes in the properties of the substrate. Cellulosic fabrics which are so treated frequently are too stiff or yellow and unappealing for most end use applications; they, also, may suffer from loss of tensile strength. The flame retardants of the prior art usually are characterized by having phosphorus, halogen, nitrogen, boron, antimony, or combinations of these elements in their molecular structures. They usually must be applied in relatively large quantities; from 5 to 35 weight percent of retardant usually is necessary to impart a significant degree of flame retardancy to a cellulosic fabric. Prior art flame retardants include the triazine phosphorus compounds of U.S. Pat. No. 2,634,270; the aminophenylphosphonitrilic polymers of U.S. Pat. No. 3,193,397; the bromine-containing phosphonitrilic esters of U.S. Pat. No. 2,681,295; the halogen-containing organophosphorous esters of U.S. Pat. No. 3,192,242; the brominated allyl antimonates of U.S. Pat. No. 3,299,173; the adducts of isocyanates and phosphorus-containing compounds of U.S. Pat. No. 2,691,566; the chlorinated organic compounds described in U.S. Pat. No. 2,413,163; the aminotriazine pyrophosphates of British Pat. No. 638,434; the chlorine-containing phosphonates of German Pat. No. 1,188,804; the hexahalocyclopentadiene/divinyl benzene adducts of U.S. Pat. No. 2,952,711, and the dibromopropyl borates of U.S. Pat. Nos. 3,189,565, and 3,250,797.

The prior art processes for applying biocides employ a direct contacting of the cellulose and an aqueous or solvent solution of the agent. In some processes the biocidal material coats only the outside of the fiber and is removed essentially completely by subsequent washing. In U.S. Pat. No. 3,190,797, a process is described in which cotton is coated with a fungicide by treating with an alkaline aqueous fungicide solution containing ethylene glycol monomethyl ether. Other prior art processes for applying biocides employ resins to bond the treating agent to the surface of the substrate. The products often are characterized by poor hand, a tendency to yellow with age, and loss of tensile strength. Prior art biocides include the substituted N-aminophthalimides of U.S. Pat. No. 2,657,169; the polyhalogenosalicylanilides of U.S. Pat. No. 2,703,332; the 2,4′-dihydroxybenzophenones of U.S. Pat. No. 2,486,961; the diphenyl urea or carbanilide derivatives of U.S. Pat. Nos. 2,745,874; 3,161,622; and 3,230,141; the chloro- or trifluoromethyl substituted 2-phenylamino-4,6-dichloro-s-triazines of British Pat. No. 1,107,789; the dihydrobenzoxazole-2-ones of U.S. Pat. No. 3,190,797, the pyrazolyl-O-alkyl phosphoramidates and thioamidates of U.S. Pat. No. 3,010,969; and such well known biocides as copper naphthenate and bis(8-quinolinato) copper.

Many chemical classes of ultraviolet light absorbers are described in the prior art. Most of them are used as photostabilizers and are incorporated as finely divided particles into polymeric materials, especially those used for film applications. Some are applied to synthetic fibers in a dyeing type of operation. Prior art classes of ultraviolet light absorbers include hydroxybenzophenones, as described in U.S. Pat. Nos. 2,773,903; 3,006,959; and 3,098,842, amino- and hydroxyphenylbenzotriazoles, as disclosed in U.S. Pat. Nos. 3,055,896, and 3,189,615; aminophenylbenzotriazoles, as described in U.S. Pat. No. 3,337,356, and its equivalent, British Pat. No. 1,037,161; α-cyanoacrylates and α-cyanoacrylamides, as described in U.S. Pat. Nos. 3,174,937, and 3,215,725; substituted salicylates, as disclosed in U.S. Pat. No. 3,277,046; substituted acyltriazines, as described in U.S. Pat. Nos. 3,118,887, and 3,293,247; acylpyrimidines, as disclosed in French Pat. No. 1,396,684; and quinoxalines, as disclosed in U.S. Pat. No. 3,325,448, and British Pat. No. 1,043,145.

The fluorescent brighteners of the prior art usually are water soluble agents which are applied by exhaustion onto the cellulosic substrate; such products usually have poor washfastness. Water insoluble fluorescent brighteners are known in the prior art but these usually are incorporated into synthetic materials rather than cellulosic materials. For example, such agents are incorporated into synthetic fibers during the spinning process. Many types of fluorescent brighteners are described in the prior art. Specifically disclosed are the coumarins, including the triazinyl coumarins of French Pat. No. 1,358,820 and the substituted phenyl coumarins disclosed in U.S. Pat. Nos. 2,702,296, and 3,352,885; azoles which are attached to ethylene groups, as described in U.S. Pat. Nos. 2,483,392, and 2,488,094; attached to stilbenes, as described in South African Pat. application No. 5645 (1963); and attached to other heterocyclic groups, such as disclosed in U.S. Pat. Nos. 2,901,480 and 2,995,564; triazoles, as disclosed in U.S. Pat. Nos. 2,784,184, and 2,972,611; phenylene divinylene dipyridines as disclosed in U.S. Pat. No. 2,980,623; oxadiazoles as disclosed in U.S. Pat. No. 2,765,304; and dibenzothiophene dioxide derivatives, as disclosed in U.S. Pat. No. 2,719,155. Fluorescent brighteners which contain sulfonic acid groups and are water soluble, for example, diamino stilbene sulfonic acids, are disclosed in U.S. Pat. Nos. 2,581,057, and 2,700,053.

Water proofing agents often are applied to cellulosic materials by prior art processes which utilize aqueous emulsions of the agent and heat. In some processes small amounts of water miscible solvents, also, are present. In such processes the agent usually is applied to the substrate as a coating. The agents used in the treatment of textile materials, generally, are of a variety of types. Natural and synthetic waxes, including long chain fatty acids and amide, N-substituted amide or metal salt derivatives thereof, can be employed. Included are simple esters, glycerides and amides of myristic, stearic, oleic and palmitic acids. Also representative of such processes and materials is U.S. Pat. No. 2,455,886. Other prior art water proofing agents include the chrome complexes of U.S. Pat. No. 2,273,040; the fluorine-containing polymers of U.S. Pat. No. 2,642,416; the N,N′-oxydimethylenebisacylamides of U.S. Pat. No. 2,793,142; ethers of methylolamide compounds, as disclosed in U.S. Pat. No. 2,313,742; the N,N′-diacyl-diaminomethanes of U.S. Pat. No. 2,365,813; reaction products of fatty acids and methoxymelamines, as disclosed in U.S. Pat. Nos. 2,398,569, and 2,835,639; and the fatty acid esters of cellulose ethers of U.S. Pat. No. 2,317,499.

The swelling of cotton fibers and other cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal 32, 331–337 (1962) report that cotton can be swollen with water containing both high boiling, water soluble, nonreactive compounds of limited molecular weight and a crosslinking agent. The water can be removed with retention of swelling, and crosslinking can then be effected. The authors suggest that the technique may be useful not only for the introduction into cotton of water soluble reactive materials (crosslinking agents) but other reactive materials which are insoluble in water but soluble in said high boiling, water soluble, nonreactive compound. A similar technique is described in U.S. Pat. No. 2,339,913, issued Jan. 25, 1944 to Hanford and Holmes. The cellulosic is swollen with water, the water then is replaced with methanol-benzene, and finally, with benzene, with retention of swelling. A cellulose-reactive material (cross-linking agent) is added as a benzene solution and crosslinking is effected.

OBJECTS AND SUMMARY OF THE INVENTION

It is an object of the present invention to provide a process for treating water swellable cellulosic materials, continuously if desired, with a broad spectrum of preformed agents selected from flame retarding agents, biocides, ultraviolet light absorbing agents, fluorescent brighteners and water proofing agents. Another object is to provide a process for applying the aforesaid agents to water swellable cellulosic materials which are admixed or blended with synthetic materials. Still another object is to provide a process for applying the same treating agent of any of the aforesaid types to both the cellulosic and synthetic components of a blend or mixture. Another object is to provide a process for applying the aforesaid agents to blends or mixtures of cotton and polyester or cotton and polyamide. A further object is to provide a process for applying any of the aforesaid agents to cotton, regenerated cellulose, wood pulp and paper, particularly paper containing purified wood pulps. Another object is to provide a process for applying to cellulosic materials preformed treating agents of the aforesaid types which heretofore have not been satisfactorily applied to cellulosic materials. A still further object is to provide cellulosic materials, and blends or mixtures thereof with synthetic materials, which, after treatment with any of the aforesaid agents by the process of this invention, are fast to aqueous washing and/or drycleaning with organic solvents. Another object is to provide cellulosic materials, and blends or mixtures thereof with synthetic materials, which, after treatment with any of the aforesaid agents by the process of this invention, exhibit the physical properties of the untreated substrate, except as altered because of the presence of the treating agent itself. Other objects will become apparent hereinafter.

The objects of this invention are achieved by means of a process which comprises contacting a water swellable cellulosic material in any sequence with the following:

1. water in an amount sufficient to swell the cellulose;
2. at least an effective amount of an agent selected from flame retarding agents, biocides, ultraviolet light absorbing agents, fluorescent brighteners and water proofing agents, said agent having a solubility in boiling water in grams per liter of less than 5 percent of said amount contacted; and
3. a solvent in an amount sufficient to maintain swelling of the cellulose if water is removed, and which
  a. is at least 2.5 weight percent soluble in water at 25° C.,
  b. boils above about 150° C. at atmospheric pressure,
  c. is a solvent for the agent at some temperature in the range of about 0° to 225° C., and
(d) has the formula

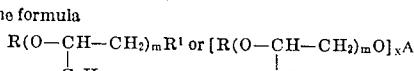

wherein
$n$ is 0 or 1;
$m$ is a positive whole number;
R is H, $C_{1-8}$ alkyl, $C_{7-15}$ aralkyl or alkaryl,

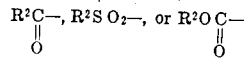

wherein
$R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$R^1$ is $-OH$, $-OR^2$, $-SR^2$, $-NHR^2$, $-NR^2(C_{1-8}$ alkyl), $-NR^2(C_{7-15}$ aralkyl or alkaryl),

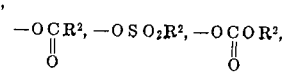

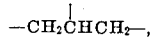

$x$ is the number of unsatisfied valences in A; and
A is $ROCH_2CHORCH_2-$, $-CH_2CHORCH_2-$, $$-CH_2\overset{|}{C}HCH_2-,$$

$-CH_2C(CH_2OR)_3$, $(-CH_2)_2C(CH_2OR)_2$, $(-CH_2)_3CCH_2OR$, $(-CH_2)_4C$, $-CH_2(CHOR)_yCH_2OR$, $-CH_2(CHOR)_yCH_2-$, or $-CH_2(CHOR)_{y-z}(-CH)_zCH_2-$ in which $y$ is 2, 3, or 4 and $z$ is 0, 1, 2, 3, or 4 but no greater than $y$;

provided that at some stage during the process the interior of the swollen cellulose is contacted with a solution of the agent in aqueous solvent or solvent.

Particular embodiments of the above process include those wherein said solution is formed within and/or outside the swollen cellulose and those wherein solution of the agent in aqueous solvent or solvent is achieved by means of heat, by reducing the proportion of water to solvent, or by adding an auxiliary solvent. Other embodiments of this invention include treating the cellulosic material at elevated temperatures.

DETAILED DESCRIPTION OF THE INVENTION

The process of this invention relates to the application of a treating agent selected from flame retarding agents, biocides, ultraviolet light absorbing agents, fluorescent brighteners and water proofing agents to a water swellable cellulosic material. The process involves swelling the cellulose with water or an aqueous solvent, replacing, if necessary, a part or all of the water with a solvent while maintaining the cellulose in a swollen condition, and contacting the interior of the swollen cellulose with a solution of treating agent in aqueous solvent or solvent.

More particularly, the present invention resides in a process which comprises contacting a water swellable cellulosic material in any sequence with the following:

1. water in an amount sufficient to swell the cellulose;
2. at least an effective amount of an agent selected from flame retarding agents, biocides, ultraviolet light absorbing agents, fluorescent brighteners and water proofing agents, said agent having a solubility in boiling water in grams per liter of less than 5 percent of said amount contacted; and
3. a solvent in an amount sufficient to maintain swelling of the cellulose if water is removed, and which
  a. is at least 2.5 weight percent soluble in water at 25° C.,
  b. boils above about 150° C., at atmospheric pressure,
  c. is a solvent for the agent at some temperature in the range of about 0° to 225° C., and
(d) has the formula

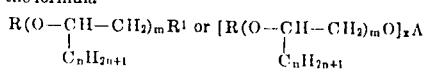

wherein
$n$ is 0 or 1;
$m$ is a positive whole number;
R is H, $C_{1-8}$ alkyl, $C_{7-15}$ aralkyl or alkaryl,

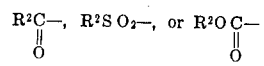

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl; $R^1$ is $-OH$, $-OR^2$, $-SR^2$, $-NHR^2$, $-NR^2$ ($C_{1-8}$ alkyl), $-NR^2$ ($C_{7-15}$ aralkyl or alkaryl),

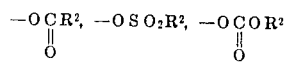

—NH (phenyl), or —NH (naphthyl);

$x$ is the number of unsatisfied valencies in A; and
A is ROCH$_2$CHORCH$_2$—, —CH$_2$CHORCH$_2$—, —CH$_2$CHCH$_2$—, —CH$_2$C(CH$_2$OR)$_3$, (—CH$_2$)$_2$C(CH$_2$OR)$_2$, (—CH$_2$)$_3$CCH$_2$OR, (—CH$_2$)$_4$C) —CH$_2$(CHOR)$_y$CH$_2$OR, —CH$_2$(CHOR)$_y$CH$_2$—, or —CH$_2$(CHOR)$_{y-z}$(—CH)$_z$CH$_2$—
in which $y$ is 2, 3, or 4 and $z$ is 0, 1, 2, 3, or 4 but no greater than $y$; provided that at some stage during the process the interior of the swollen cellulose is contacted with a solution of the agent in aqueous solvent or solvent.

Particular embodiments of the above process include those wherein said solution is formed within and/or outside the swollen cellulose and those wherein solution of the agent in aqueous solvent or solvent is achieved by means of heat, by reducing the proportion of water to solvent, or by adding an auxiliary solvent. Other embodiments of this invention include treating the cellulosic material at elevated temperatures.

Still other embodiments of the present invention include a rapid and simplified process of treating blends or mixtures of cellulosic and synthetic materials, such as a polyamide or polyester, with one of the aforesaid agents and, if desired, employing the same agent to treat both the cellulosic material and the synthetic material. In the present process the components of the blend or mixture can be treated at the same time or in independent steps.

Many sequences are practical for the application of water, solvent and treating agent to a water swellable cellulosic material in carrying out the process of this invention. The preferred method involves applying water, solvent and treating agent from a single padbath, squeezing to remove excess padbath liquor and to assure uniform penetration of the fabric, and heating to evaporate water. As the excess water is evaporated, the treating agent dissolves and treats the cellulosic material. Frequently, the water is removed in stages in order to prevent migration of the treating agent. The treating agent usually is prepared as a dispersed paste by standard techniques, such as ball milling in the presence of a dispersing agent. The padbath is prepared by diluting the paste with water and then adding solvent. Addition of the solvent directly to the paste is to be avoided since it frequently causes coagulation of the dispersion. Other additives can be present in the padbath and include migration inhibitors, thickeners and wetting agents.

For application from a single padbath the amount of water in the padbath mixture can vary from about 10 to 95 weight percent of the mixture, with the preferred amount being about 70 to 95 weight percent. The maximum amount of water is limited only by the amount of solvent in the padbath, which may be as little as 5 percent. The amount of solvent in the padbath must be sufficient to maintain the cellulose in a swollen state and to dissolve an effective amount of the treating agent. This amount will depend to a considerable extent on the type of treating agent being applied and the actual application conditions. For those treating agents which are applied in relatively small amounts, such as biocides and brightening agents, the amount of solvent will be smaller than for the treating agents which are applied in relatively large amounts, for example, the flame proofing agents. In most cases the amount of solvent will be from about 5 to 30 weight percent of the mixture. Larger amounts of solvent tend to cause coagulation of the padbath; hence, where larger amounts of solvent are required on the cellulosic material, it is preferable to use a lower concentration of solvent in the padbath and operate at a larger pick-up in the padding operation. Padbath pick-up usually is 60 to 100 percent, based on the weight of substrate.

Methods of application other than the above pad-heat procedure can be utilized. For example, any two of the components can be applied to the cellulosic material simultaneously and the third at a different stage of the process. For example, the water and treating agent can be applied as a dispersion by spraying, vacuum impregnation, printing, conventional padroll techniques, or by any other convenient method, followed by subsequent application of the solvent from the surface of an embossed roll, through a porous screen or roll, by condensation onto the substrate from the vapor phase, or by any other convenient technique. Alternatively, the treating agent and solvent can be applied together, followed by application of the water. The treating agent and solvent can be applied as a solution of the agent in hot solvent or as a dispersion of the agent in cold solvent. Optionally the agent and/or solvent can be applied as a solution in an auxiliary solvent such as a halogenated hydrocarbon boiling below about 130° C. Another alternative method of application is to apply the treating agent first, for example, as a dry powder by electrostatic techniques or as a dispersion in water followed by evaporation of the water; subsequently a mixture of water and solvent is applied by any convenient method.

If desired, the application of one or more of the necessary components can be carried out with heating. For example, a substrate containing treating agent and solvent at room temperature can be contacted with superheated steam to provide both the water necessary for swelling the cellulosic material and the heat required to remove excess water and increase the solubility of the treating agent in either aqueous solvent or solvent.

It is obvious from the above that the process of this invention is applicable to the treating of textile materials. It, also, is obvious that mixtures of treating agents of the aforesaid types can be applied simultaneously by the process of this invention. This process can be used to treat paper, or the treating agent can be added to the paper stock using conventional beater techniques.

The amount of water required for effective treating by the process of the present invention is much less than the amount applied to substrates by padding as described above. In a typical padbath operation, a pickup of about 70 percent, based on the weight of cellulosic substrate, from a padbath containing about 70 percent water provides a substrate with over 50 weight percent water, allowance being made for the equilibrium amount of water usually present in the cellulose before padding. The exact amount of water required for swelling cellulosic materials depends on the experimental conditions, but in a typical pad-heat process it ranges from about 10 to 20 percent of the dry material weight. Since cellulosic materials in equilibrium with air at normal relative humidity may contain only 5 percent water, additional water usually is required to achieve the necessary swelling. Large amounts of water increase the time and expense required for its evaporation and may result in unwanted migration of treating agent when drying is effected by application of heat directly to the surface of the fabric.

The amount of solvent required for effective treating by the process of the present invention depends somewhat on the particular solvent used. More solvent usually is required if excessive amounts are lost during any heating step. Moreover, the amount of solvent required is influenced by the type and solubility of the treating agent being applied. The amount must be sufficient to dissolve an effective amount of treating agent at the treating stage of the process, that is, as the interior of the swollen cellulose is being contacted with agent. Moreover, it must be present in sufficient amount to maintain swelling of the cellulose if water is removed. Usually, the amount of solvent will vary from about 3 to 60 weight percent of the substrate being treated.

Since the present invention relates to a process of application of, for the most part, known treating agents, approximately the same amounts of treating agents are applied to the substrates being treated as are employed in the art. The present process provides the advantage that the treating agent is more uniformly distributed throughout the substrate, thus rendering the treatment more effective and enhancing fastness of the treated substrate to washing and/or drycleaning. The amount of treating agent applied to the substrate is at least the amount which is required to achieve the effect desired. Because of the vast differences between the types of agents useful herein, the amounts required vary considerably. For example, flame retarding agents generally are applied in high concentrations, whereas the remaining treating agents operable herein are applied at low to intermediate concentrations.

The temperature at which an effective amount of the treating agent dissolves in the aqueous solvent or solvent is a particularly controlling factor in determining the optimum temperature of any heating step in the process of this invention. Some treating agents have adequate solubility at room temperature, particularly when an auxiliary solvent is present; hence, a heating step is not required. Most agents require a temperature of at least 125° C. to achieve adequate dissolution. Temperatures of at least about 180° C. usually are required for blends of cellulosic and polyester fibers if both fibers are to be treated simultaneously. The practical upper temperature limit is about 225° C. because higher temperatures frequently cause permanent changes not only in the cellulosic material but, also, in the synthetic material, if present. The heating step can be performed in any convenient method. Satisfactory methods include contact with heated metal surfaces, contact with a molten metal bath, exposure to infra-red radiation or to superheated steam, and heating in a forced-draft hot gas oven. As already indicated, the heating step can be combined with application of water and/or solvent. Heat can be applied in several stages, and by different means, if desired, to prevent migration of the treating agent.

The required time of heating depends on the means of heating and the rate of dissolution of the treating agent in the aqueous solvent or solvent. Contact methods of heating usually require shorter heating periods and can be as short as one second if contact is good. Heating times of 30 to 180 seconds are common in hot air ovens. The heating can be in stages, also, to effect stepwise treatment of blends of cellulosic and synthetic materials.

Materials treated by the process of this invention sometimes can be used without further processing but, depending on the efficiency of the treating operation, they may contain some treating agent which has not penetrated the cellulose. This material will be on the surface of the cellulose and it frequently is desirable to remove it by scouring. An aqueous detergent scour can be used. Subsequent washing or drycleaning will remove little, if any, of the treating agent remaining after scour.

Suitable cellulosic materials which can be treated by the process of this invention are all forms which swell when in contact with water and include natural fibers, purified wood pulps, and reconstituted cellulose in both fiber and film form. Particularly suitable is cotton in any of the forms in which it is conventionally used in the textile industry. For example, mercerized cotton can be treated by the present process. Other suitable materials include reconstituted cellulosic fibers, particularly those fibers, such as cuprammonium rayon, which are sufficiently open to be readily swollen and then penetrated by the solvent. Xanthate viscose rayon is less open in structure and is more difficult to penetrate. Treatment of viscose rayon is more successful at lower temperatures and with longer heating times, in the presence of wetting agents, or after pretreatment for 10-30 seconds with 10-20 percent sodium hydroxide. Mixtures of cotton and rayon, also, can be used.

Suitable synthetic materials which can be treated by this process when blended or admixed with cellulosic materials include polyesters, polyamides, cellulose ethers and esters and polyacrylonitrile, as well as copolymers and mixtures of these synthetic materials. A particularly suitable substrate for treatment by this process is a blend containing 65-80 percent polyethylene terephthalate and 20-35 percent cotton. In treating such a blend, the polyester fibers can be treated by employing the conditions required under the well-known Thermosol process for dyeing fibers. This, generally, involves heating to at least about 180°C.

The specific classes of treating agents which are useful in the present invention are flame retardants, biocides, ultraviolet light absorbers, fluorescent brighteners and water proofing agents. As indicated above, the prior art includes numerous compounds within each class of treating agent. The process of the present invention is operable with any compound falling within any of the aforesaid classes of treating agents provided that it has a very low solubility in boiling water and is soluble in the solvent, as defined below, at some temperature in the range of 0° to 225° C. The operable treating agents include not only those which are known treating agents for cellulose but those which heretofore have not been operable for the treatment of cellulosic materials. The agents are preformed in that they are applied as such to the substrate, that is, in the form conventionally employed in the art. In other words, no chemical modification, such as oxidation, reduction, condensation, and the like, is required as part of the process of application. The agent must be sufficiently insoluble in liquids with which the treated material will come into contact under normal use conditions so that it is not removed from the treated article during subsequent use. For example, the treating agents which are applied to cotton by this invention should be insoluble in hot washing solutions if the treated cotton is to be subjected to conventional washing operations. It has been found that solubility in boiling water is a satisfactory guide for predicting the results of wash tests. Solubility can be determined by standard methods, such as those disclosed on pages 297-326 of "Physical Methods of Organic Chemistry," Volume 1, second edition, A. Weissberger, published by Interscience, New York, New York, 1949. The solubility of the treating agent in boiling water in grams per liter must be less than about 5 percent of the amount which is contacted with the substrate.

Many textile materials are treated with resins to impart crease resistance to the fabric. The most common resins are of the dimethyloldihydroxyimidazolone type. Such after treatments can be carried out on materials treated by the process of this invention by employing methods well known in the trade, for example, using an acid catalyst; improved washfastness may be realized.

As stated above, the treating agent must be soluble in the solvent at some temperature in the range of about 0° to 225° C. When treating cotton it is preferred that the agent be soluble in the solvent at least by about 125° C. For effective treating by the process of this invention, the agent must be capable of existing in solution in the interior regions of the cellulosic material under conditions of treating. Although this limitation usually is met principally by a consideration of the agent and solvent, it must be recognized that the treating process may entail other features which will affect the solubility of the agent. For example, contacting of a solution of agent and the interior of the cellulosic material can be facilitated by increasing the temperature, by removal of water so as to increase the proportion of solvent to water, or by adding an auxiliary solvent which will be discussed more fully below. The most effective evaluation of an agent's usefulness can be made by simulating the treating conditions as to temperature and ingredients (liquid medium) present within the cellulose. If the agent dissolves to an extent which will be adequate to effectively treat the cellulose, it will be operable in the present process. Generally, when the solubility of the treating agent in such liquid medium is less than about 0.05 gram per liter, the treatment process will be inefficient.

It has been discovered that prior art treating agents which are inoperable herein because they do not meet the solubility characteristics requisite to the present process, in some cases can be modified chemically to provide the requisite solubility characteristics.

Any agent which is applied by the process of this invention can be detected in the treated substrate by conventional analytical techniques.

When agents having flame retarding properties are applied to water swellable cellulosic materials by the process of this invention, it is to be understood that any prior art considerations relative to flame retardants are applicable, subject to the solubility limitations set forth above. For example, many prior art retardants, as applied, decompose during active use to provide the actual retardant, usually an acidic material. The preferred flame proofing agents for use herein are phosphorus-containing compounds. The preferred phosphorus-containing agents are esters and amides. Nitrogen or bromine can be present in the compound with the phosphorus as a synergist. Generally, 5 to 35 weight percent flame retardant, based on the weight of dry substrate, is an effective amount. Such retardants have solubilities in boiling water of less than 1.75 grams per liter. When retardants containing only phosphorus as the flame proofing moiety are employed, it usually is desirable to apply sufficient agent to the cellulosic material so as to provide about 2 weight percent phosphorus on the substrate. Lesser amounts of phosphorus, for example, about 1 percent, can be used if synergistic elements are present in the retardant, for example, about 6 weight percent nitrogen or about 10 weight percent bromine. Generally, retardants containing high percentages of carbon are to be avoided. Mixtures of agents can be employed. A convenient method of evaluating flame proofing agents applied by the process of this invention is Vertical Strip Flammability Test Method 34-1966 of the American Association of Textile Chemists and Colorists (AATCC). Products exhibiting a char length of 6–7 inches generally are considered acceptable under commercial flammability standards.

The term biocide as it is used herein includes any treating agent which kills, repels or inhibits the growth of the biological environment of the substrate. It is obvious, therefore, that the term includes fungicides, bacteriostats and mildew inhibitors. The biocide and the amount applied by the process of this invention are determined by prior art considerations, subject to the solubility limitations set forth above. The effective amount of biocide usually is 0.1–1.0 weight percent based on the weight of dry substrate. Such biocides have solubilities in boiling water of less than 0.05 gram per liter.

Ultraviolet light absorbing agents useful in the present process include any such agent which exhibits the requisite solubility characteristics defined above. The effective amount for ultraviolet light absorbers usually is 0.1 to 1.0 weight percent agent, based on the weight of dry substrate. Such ultraviolet light absorbers have solubilities in boiling water of less than 0.05 gram per liter.

Fluorescent brighteners useful in the present invention, likewise, are determined by prior art considerations, subject to the solubility limitations set forth above. The effective amount for brightening agents usually is 0.005 to 0.10 weight percent, based on the weight of dry substrate. Such brighteners have solubilities in boiling water of less than 0.005 gram/liter. Some readily-available prior art brighteners which have excessive water solubilities for use herein can be chemically modified to reduce their solubilities in water, thus making them useful in the present invention. For example, diaminostilbene sulfonic acids can be converted to relatively insoluble sulfonamides by well known amination procedures, such as by reacting first with $PCl_5$ or $SOCl_2$ and then with an amine.

Suitable water proofing agents for use herein can be selected based upon prior art considerations, subject to the solubility limitations set forth above. Paraffinic waxes are not useful. The effective amount for water proofing agents usually is 2 to 15 weight percent agent, based on the weight of dry substrate. Such water proofing agents have solubilities in boiling water of less than 0.75 gram per liter.

Solvents which are useful in the process of the present invention can have volatilities which are relatively high under the process conditions but the preferred solvents are essentially non-volatile. Since it frequently is necessary or desirable to separate water from the solvent, the boiling point of the solvent should be above about 150° C. at atmospheric pressure. Solvents found to be especially useful in this invention:
a. are at least 2.5 weight percent soluble in water at 25° C.;
b. boil above about 150° C. at atmospheric pressure;
c. are solvents for the agent at some temperature in the range of about 0° to 225° C.; and
d. have the formula

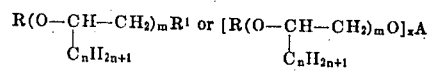

as defined hereinbelow.

One of the aforesaid classes of solvents includes glycols and derivatives of glycols having the structure:

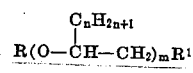

in which $n$ is 0 or 1,
$m$ is a positive whole number,

R is selected from the class consisting of H, $C_{1-8}$ alkyl, $C_{7-15}$ aralkyl or alkaryl,

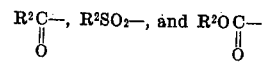

in which $R^2$ is selected from the class consisting of $C_{1-8}$ alkyl, $C_{5-10}$ cycloalkyl, $C_{7-15}$ aralkyl or alkaryl, $C_6$ aryl, $C_{10}$ aryl, and furfuryl, and
$R^1$ is selected from the class consisting of —OH, —$OR^2$, —$SR^2$, —$NHR^2$, —$NR^2$($C_{1-8}$ alkyl), —$NR^2$($C_{7-15}$ aralkyl or alkaryl),

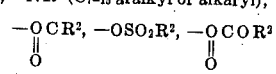

—NH(phenyl), and —NH(naphthyl).

A particularly preferred class of solvents is the above in which $n$ is 0 and $m$ is 2 to 25.

For example, when $n$ is 0, $m$ is greater than 1, R is H, and $R^1$ is -OH in the above formula, the solvent are polyethylene glycols which are available as articles of commerce in various molecular weights and molecular weight ranges. Triethylene glycol and polyethylene glycol of average molecular weight 600 are representative of such glycols.

Similarly, when $n$ is 0, $m$ is greater than 1, R is $C_{1-8}$ alkyl, and $R^1$ is -OH in the above formula, the solvents are alkyl ethers of polyethylene glycols and when R is H and $R^1$ is

the solvents are esters of polyethylene glycols. The preferred solvent members of these classes are the methyl ethers and acetate esters, as well as diethers, diesters, and ether esters, such as methoxy diethylene glycol acetate.

Beta-phenoxyethanol is an example of a useful solvent of the above class in which $n$ is 0, $m$ is 1, R is H, and $R^1$ is -$OR^2$ wherein $R^2$ is $C_6$ aryl.

Solvents of the above formula in which $n$ is 1 and $m$ is greater than 1 are polypropylene glycols or derivatives of polypropylene glycols. Because of the lower water solubilities of the polypropylene glycols and their derivatives, the preferred solvents of this class are of lower molecular weight than the corresponding polyethylene glycols and derivatives. Typically, $m$ is 4 to 12.

Suitable solvents of the above types which contain both ethylene glycol and propylene glycol moieties in their structures are also commercially available. Such solvents can be made by processes involving condensation of varying amounts of ethylene oxide with polypropylene glycols of various molecular weights, optionally with later conversion to esters or other chemical derivatives.

Other suitable solvents of the above types are reaction products of alkylene oxides with phenols, aryl amines, mercapto compounds, and sulfonic acids. Typical useful solvents of this type include products of the reaction of about ten moles of ethylene oxide per mole of phenol, aniline, thiophenol, naphthol, or sodium p-toluene sulfonate. Still other suitable solvents can be obtained by reaction of a polyglycol, such as a polyethylene glycol of about 600 average molecular weight, with one or two chemical equivalents of a compound such as ethyl chloroformate or methane sulfonyl chloride.

The other of the aforesaid classes of solvents for use herein includes a group of completely water-miscible compounds having the structure

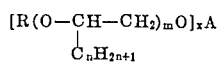

in which $x$ is the number of unsatisfied valencies in A;
A is selected from the group consisting of ROCH$_2$CHORCH$_2$-, -CH$_2$CHORCH$_2$-,

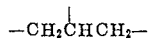

-CH$_2$C(CH$_2$OR)$_3$, (-CH$_2$)$_2$C(CH$_2$OR)$_2$, (-CH$_2$)$_3$CCH$_2$OR,(-CH$_2$)$_4$C, -CH$_2$(CHOR)$_y$CH$_2$OR, -CH$_2$(CHOR)$_y$CH$_2$-, and -CH$_2$(CHOR)$_{ycHz}$(-CH)$_z$CH$_2$- in which $y$ is 2,3, or 4 and $z$ is 0, 1, 2, 3, or 4 but no greater than $y$; and $n$, $m$ and R are as defined above.

Many examples of compounds of this class are articles of commerce currently used primarily as polyol components in the production of urethane rubbers and foams. Representative are reaction products of alkylene oxides with glycerol, trimethylol propane, pentaerythyritol, and sorbitol, for example, those with average molecular weights of about 500. Such reaction products further modified by treatment with agents reactive toward their hydroxyl groups are also useful solvents in the subject treating process so long as they retain adequate water solubility. Exemplary solvents of this type can be obtained by reaction of sorbitol with ethylene oxide to obtain a product with an average molecular weight of about 600, followed by treatment with methyl chloroformate or acetic anhydride to react with up to about one half of the hydroxyl groups present.

The preferred solvents within this second class of solvent are polyols, and ether and ester derivatives thereof, wherein $n$ is zero and $m$ is no greater than 25.

Complete miscibility of the solvent with water at room temperature is desirable but not essential. Particularly in padbath operations for treating fabric, the use of completely water miscible solvents simplifies preparation of the treating bath and assures uniform penetration and treatment of the fabric. That complete miscibility with water at room temperature is not essential is borne out by the fact that β-phenoxy-ethanol is satisfactory as a solvent even though it is soluble in water only to the extent of about 2.5 weight percent at room temperature of 25° C. This solvent can be applied by spraying, by padding of a solution thereof in any solvent in which it is soluble, followed by evaporation of the solvent, or as an emulsion in a padbath containing water and treating agent. Solvents having solubilities in water less than about 2.5 weight percent at 25° C. will not function effectively at convenient operating temperatures and, therefore, are unsatisfactory in the present process.

It has been mentioned above that auxiliary solvents can be employed in the process of the present invention. Such solvents do not meet the requisites of the treating agent solvents but merely represent an optional material which can be present at some stage of the process. Auxiliary solvents are hologenated hydrocarbons boiling below about 130° C. at atmospheric pressure and include trichloroethylene, tetrachloroethylene, methyl chloroform, methylene chloride and 1,1,2-Trichloro-1,2,2-trifluoroethane. They have been found particularly useful in providing a means for introducing the treating agent in a dissolved form and, also, for solubilizing agent/water/solvent or agent/solvent mixtures for contacting the interior of the swollen cellulose.

So as to illustrate the many operable variations covered by the present invention, the following descriptions are provided:

A. A mixture of a water insoluble flame retardant, solvent and water is applied to cotton fabric by padding and the fabric is heated at 180° C. for three minutes. The cotton becomes swollen with water during the padding operation and the initial stages of heating. As the heating continues, water evaporates and the treating agent dissolves and contacts the interior of the cotton fiber to complete the treating process. The treated cotton is resistant to flames and has an excellent hand; the effect is durable to washing and drycleaning.

B. A solution of fungicide in a mixture of solvent and an auxiliary solvent is padded onto cotton fabric and the fabric then is passed into a chamber containing superheated steam. The superheated steam causes evaporation of some of the auxiliary solvent and water condenses on the fabric. The water swells the cotton and, as heating continues, water evaporates and the fungicide dissolves. The fabric thus is completely treated and is resistant to attack by fungi.

C. Cuprammonium rayon is padded with a mixture of water and solvent and heated to evaporate essentially all of the water so as to produce swollen rayon containing solvent. The swollen rayon is sprayed with a solution of an ultraviolet light absorber dissolved in an auxiliary solvent and then heated at 200° C. to effect treatment of the rayon. The ultraviolet light absorber is not removed by normal washing or drycleaning.

D. An emulsion of water, solvent and a suitable bacteriostat is sprayed onto cotton fabric. Excessive water is removed from the water swollen fabric at reduced pressure and room temperature to obtain the cotton fabric swollen with a liquid medium which is a solvent for the bacteriostat. The treated fabric is resistant to bacterial attack.

E. A dispersion of water, solvent and a fluorescent brightener is padded onto cotton fabric; the cotton fibers swell. Most of the water is removed by evaporation and the fabric is placed in a metal bomb and heated at 150° C. for 3 hours. The brightener dissolves sufficiently at the elevated temperature to effect treatment of the cotton. The cotton fabric appears brighter than before the treatment.

F. Paper containing a flame retardant is prepared by conventional procedures after adding a dispersion of the retardant and some alum to paper stock in a beater. The paper is sprayed with aqueous solvent and heated to evaporate the water. The treated paper is less flammable than before treatment and the retardant is not easily removed by abrasion or bleeding.

G. Cotton threads which are thoroughly swollen with water are passed into a boiling solution containing solvent, an auxiliary solvent and a flame retarding agent. The flame retardant enters and treats the cotton thread; the effect produced is permanent to subsequent washing or drycleaning.

Representative examples more specifically illustrating the invention follow. Unless otherwise indicated all parts are by weight.

EXAMPLE 1

A. A continuous length of cotton jean cloth was padded at 75 percent pickup based on the weight of the fabric, with a padbath made from 10 grams of an aqueous paste containing 10 percent by weight of 2-(m-chlorostyrl)napth[2,1-d]oxazole as a fluorescent brightener, a mixture of 30 grams of diethylene glycol diacetate and 19 grams of triethylene glycol diacetate as solvent, 6 grams of gum tragacanth, 1.2 grams of a nonionic surfactant, and 133 ml. of water.

The padded cloth was passed continuously through a circulating air oven at 190°–195° C. at a rate such that each portion of the cloth was heated in the oven for 90 seconds. A portion of the heated dry fabric was boiled for 15 minutes with a 2 percent oleate soap solution to scour the fabric, it was then dried. When a portion of this dried scoured fabric was compared with untreated cloth under an ultraviolet light source which filtered out essentially all visible light, the treated fabric fluoresced a brilliant blue while the untreated cloth had essentially no fluorescence.

B. The treating and scouring procedure of (A) was repeated using a fabric containing 65 percent polyester and 35 percent cotton. Under ultraviolet light, both the cotton and the polyester fluoresced blue.

EXAMPLE 2

A. A portion of cotton jean cloth was padded with a padbath of the same composition as that of Example 1 except that the fluorescent brightener was a methyl substituted $\alpha,\beta$-dibenzoxazolyl ethylene of the type disclosed in U.S. Pat. No. 2,483,392. After heating as in Example 1, a portion of the treated fabric was rubbed with a clean cloth and was found to have good crock properties. Another portion was scoured and dried as in Example 1; this portion exhibited a moderately intense blue fluorescence.

B. A portion of 65/35 "Dacron" polyester/cotton fabric was treated as in (A), scoured, dried and compared with untreated fabric in daylight. It was found to appear much whiter than the untreated fabric. Under an ultraviolet light source which was filtered essentially free of visible light, both types of fibers in the treated fabric were observed to emit blue light.

EXAMPLE 3

A. A continuous length of combed cotton broadcloth fabric weighing about 3 ounces per square yard was padded to about 75 percent pickup, based on weight of fiber, with a padbath containing water, 0.8 gram per liter of 4,4'-bis(2,4-dimethoxybenzoylamino)-stilbene as a fluorescent brightener (added as a dispersion), and 60 grams per liter of methoxypolyethylene glycol, molecular weight 350. The padded fabric was passed at a rate of 2 yards per minute between two 1,000 watt infra-red lamps (Fostoria-Fannon, Inc., Infra-red Heater Model 6624), with each lamp shining on opposite surfaces of the fabric from a distance of about 3 inches. The continuously moving fabric was passed through a circulating air oven at 80°–100° C., with a hold-up time of 1 minute, and then through an oven at 180°–185° C., with a hold-up time of 1.7 minutes. The hot dry fabric was cooled to room temperature, rinsed three times in water at 25°–30° C., and dried by ironing. A portion of the dried rinsed fabric was compared with untreated fabric in daylight and was found to appear much whiter than the untreated fabric. Under an ultra-violet light source which was filtered essentially free of visible light, the treated fabric fluoresced a brilliant blue.

B. A padbath identical to that described in (A) but using 120 grams per liter of dipropylene glycol instead of methoxypolyethylene glycol was used to apply the fluorescent material to another portion of the 3-ounce cotton broadcloth. The procedure was identical to that of (A); the rinsed and dried cloth fluoresced a brilliant blue.

Portions of the cotton fabrics from (A) and (B) were subjected to a No. 2 wash test (Method 36-1956 of the American Association of Textile Chemists and Colorists, AATCC). After ironing dry, the fabric pieces were compared visually under ultraviolet light essentially free of visible light. The intensity of light fluoresced by the fabrics from (A) and (B) was strong. Visual comparison of the fabrics in daylight with untreated fabric showed that the fabrics from (A) and (B) were much whiter than untreated fabric.

EXAMPLE 4

The procedures of Example 3 were repeated except that the brightener used was 4,4'-bis (phenylureido)stilbene-2,2'-disulfonamide. Similar results were obtained.

EXAMPLE 5

Following the procedures of Example 3 disperse paste samples of 1,2-bis(benzimidazolyl)ethylene and of two commercial whiteners, a methyl substituted and a cyclohexyl substituted $\alpha,\beta$-dibenzoxazolyl ethylene of the type disclosed in U.S. Pat. No. 2,483,392, were applied to portions of cotton broadcloth from aqueous baths containing either 60 grams per liter of methoxypolyethylene glycol, molecular weight 350, or 120 grams per liter of dipropylene glycol. The treated fabrics appeared much whiter than the untreated fabric and fluoresced strongly under ultraviolet light.

EXAMPLE 6

A. A continuous length of cotton twill fabric weighing about 8 ounces per square yard was padded to about 70 percent pickup, based on the weight of fabric, with a padbath containing water, a sufficient amount of a dispersion of the phosphazene fire retardant 2,2,4,4,6,6-hexaphenylaminocyclotriphosphazatriene (trimeric phosphonitrilic anilide) to provide a concentration of 170 grams per liter, and 200 grams per liter of methoxypolyethylene glycol, molecular weight 350. The padded cloth was passed at a rate of 2 yards per minute between infra-red lamps as in Example 3. The continuously moving fabric was then passed through a circulating air oven at 110°–120° C., the hold-up time for any segment of cloth being 1 minute. The fabric next was passed through an oven at 165°–170° C., the hold-up time in this oven being 1.7 minutes. The fabric was scoured for 10 minutes in 40°–45° C. running water and dried in a tumble drier. The treated fabric had a soft hand similar to that of the untreated fabric and its color and tear strength were not noticeably altered. A portion of the dry scoured fabric was tested by the Vertical Strip Flammability Test and was found to exhibit flame resistant characteristics; it did not exhibit afterglow. The char residue obtained on completely burning a portion of the treated fabric had a weight equal to 18 percent of the weight of the treated fabric. The untreated control fabric showed prolonged afterglow and gave a char residue of less than 1 percent when burned.

B. A padbath identical to that described in (A) but containing 120 grams per liter of dipropylene glycol was used to apply the phosphazene flame retardant to 8 ounce cotton twill fabric. The procedure was identical to that of (A); the dry scoured fabric exhibited flame resistant characteristics.

Portions of the cotton fabrics from (A) and (B) were subjected to a household laundering test (similar to Method 88A-1964 of the AATCC) and other portions were subjected to a tumble-jar dry cleaning fastness test (similar to Method 70B-1964 of the AATCC). Both fabrics from (A) and (B) retained significant flame retardancy and absence of afterglow when tested by the Vertical Strip Flammability Test. Microanalyses of the washed and drycleaned fabrics from (A) and (B) indicated retention of most of the phosphorus initially applied.

EXAMPLE 7

The procedure described in Example 6(A) was used to apply trimeric phosphonitrilic anilide to a 50/50 polyester/cotton blend fabric weighing about 7 ounces per square yard. The treated fabric exhibited reduced flammability both before and after washing or drycleaning. Its hand, color, and tensile strength were not significantly altered. Microanalyses of the washed and drycleaned fabrics indicated retention of most of the applied phosphorus.

EXAMPLE 8

A mixture of 53 parts of N,N',N''-tris(3,4-dichlorophenyl)phosphoramide and 47 parts of dimethyl formamide was warmed to 40°–45° C. until a clear solution was obtained. A sample of cotton twill weighing about 8 ounces per square yard was impregnated with this solution and squeezed to retain a pick-up of about 70 percent, based on the original weight of the fabric. The fabric was dried in a forced-air draft oven maintained at 100° C. The dry, phosphoramide impregnated, fabric was padded at about 65 percent pick-up with water containing 200 grams per liter of methoxypolyethylene glycol, molecular weight 350. The padded fabric was heated, washed and dried as in Example 6(A). The dried fabric had excellent resistance to burning and afterglow when tested by the Vertical Strip Flammability Test. This property was retained after subjecting the fabric to home laundering or to drycleaning using the methods indicated in Example 6. Microanalyses of samples of fabric which had been subjected to five home launderings or to a single drycleaning cycle indicated that most of the applied phosphorus was retained on the fabric.

EXAMPLE 9

A length of cotton twill fabric weighing about 8 ounces per square yard was impregnated with a solution of 42 parts of bis(p-bromophenyl)chloromethylphosphonate in 58 parts of dimethylformamide at a pick-up of about 70 percent, based on the dry weight of the fabric. The fabric was dried in a forced-air draft oven maintained at 100° C. The dry impregnated fabric was padded (pick-up about 65 percent) with a solution containing 360 parts of water, 100 parts of methoxypolyethylene glycol, molecular weight 350, 25 parts of "Superclear" 100N antimigratory agent (Nopco Chemical Co.,), and 0.5 part of an isooctylphenoxypolyethoxyethanol wetting agent prepared from about 10 moles of ethylene oxide per mole of the phenol. The padded fabric was passed at 2 yards per minute through a circulating air oven at 120° C. with a hold-up time of one minute, and then through an oven at 165°-170° C. with a hold-up time of 1.7 minutes. The fabric was scoured in warm running water for 10 minutes and dried in a tumble drier. The hand, color and tear strength of the dry scoured fabric were similar to those of untreated fabric. The treated fabric exhibited flame resistance when tested by the Vertical Strip Flammability Test, did not exhibit afterglow, and gave a char residue after burning equal to 13 percent of the weight of the treated fabric. Untreated fabric showed prolonged afterglow and gave a char residue of less than 1 percent.

A portion of the above fabric was subjected to a household laundering test. The laundered fabric exhibited flame resistance, did not exhibit afterglow, and gave a char residue after burning equal to 11 percent of the weight of the treated fabric. Microanalyses of portions of the fabric before and after laundering indicated that the laundering removed essentially none of the phosphorus.

EXAMPLE 10

A mixture of 40 parts of N,N',N''-trimethyl-N,N',N''-triphenylphosphoramide and 60 parts of dimethyl acetamide was warmed to 70° C. until a clear solution was obtained. A continuous length of cotton twill weighing about 8 ounces per square yard was impregnated with this solution at a pick-up of about 70 percent, based on the weight of dry fabric; it was dried, overpadded and heated as in Example 9. The hand, color and tear strength of the dry scoured fabric were unchanged by the treating process. The treated fabric exhibited flame resistance by the Vertical Strip Flammability Test. It did not exhibit afterglow and retained these properties after five home laundering cycles. Microanalyses indicated that most of the phosphorus was retained after the five home laundering cycles.

EXAMPLE 11

A length of 50/50 polyester/cotton fabric weighing about 7 ounces per square yard was impregnated (70 percent pick-up) with a solution of 22 parts of N,N',N''-triphenylphosphoramide, 20 parts of 2,2-bis(3,5-dibromo-4-hydroxyphenyl)propane, and 58 parts of dimethylformamide. It was dried in an oven at 100° C., repadded (65 percent pick-up) with a 15 percent aqueous solution of methoxypolyethylene glycol, molecular weight 350, redried at 100° C., and then heated at 210° C. for 5 minutes. The fabric was cooled, scoured in 40°-50 C. water, dried, washed in tetrachloroethylene, and redried. The weight of the resulting fabric was 19 percent greater than untreated material. There was no noticeable change in hand, color or tear strength. The dry scoured fabric had excellent resistance to burning and afterglow in the Vertical Strip Flammability Test and retained these properties after a home laundering cycle.

EXAMPLE 12

A. Combed cotton broadcloth was padded to about 70 percent pick-up, based on weight of fabric, with a padbath containing water, 22 grams per liter of the ultraviolet screener 2-(2-hydroxy-5-methylphenyl)-2,1,3-benzotriazole, as a dispersion, and 100 grams per liter of methoxypolyethylene glycol, molecular weight 350. The padded cloth was heated and rinsed as in Example 3.

B. A padbath identical to that described in (A) but containing 100 grams per liter of dipropylene glycol instead of methoxypolyethylene glycol was used to apply the ultraviolet screening agent to the cotton broadcloth. The procedure was identical to that of (A).

Portions of the cotton fabrics from (A) and (B) were subjected to a No. 2 wash test (Method 36-1965 of the AATCC). After ironing dry, the fabric pieces were compared as to ultraviolet reflectance. The reflectance data showed that the washed fabric still absorbed ultraviolet light.

EXAMPLE 13

The procedure of Example 12(B) was used to apply [2,2'-(2,3,5,6-tetramethylterephthaloyldiimino)-o-phenylene]-bis-2,1,3-benzotriazole ultraviolet light screener to cotton broadcloth. Reflectance data showed that the fabric still absorbed ultraviolet light after washing.

EXAMPLE 14

Cotton broadcloth was treated with 4-dodecyloxy-2-hydroxybenzophenone as an ultraviolet light screener, using the procedures of Examples 12(A) and 12(B). The quality of the products was comparable to that of the treated cloth of Example 13.

EXAMPLE 15

Tribromosalicylanilide was applied to cotton from a padbath containing 13 grams per liter of the bacteriostat by the procedures of Examples 12(A) and 12(B). The fabrics were analyzed for nitrogen both before and after a No. 2 wash test. After the wash test the fabrics from (A) and (B) still retained bacteriostat and were resistant to bacterial attack.

Improved washfastness was obtained when the treated fabric was aftertreated with 15 percent of a resin of the dimethyloldihydroxyimidazolone type.

EXAMPLE 16

Example 15 was repeated using a commercial dispersion of the fungicide dodecylguanidine terephthalate (sold under the trademark "Durotex" 7487-A by Scientific Chemical Co.). Results similar to those of Example 15 were obtained.

EXAMPLE 17

A cotton poplin fabric was padded (70 percent pick-up) from a padbath containing 16.8 parts of a water proofing agent prepared by condensing a $C_{15-21}$ fatty acid and hexamethoxymethylmelamine at a molar ratio of about 6:1 (added as a 25 percent aqueous emulsion using 2 percent dimethyloctadecylammonium acetate as emulsifying agent), 2 parts of purified vegetable gum ("Superclear" 100N), 25 parts of triethylene glycol diacetate and about 56 parts of water. The padded material was heated as described in Example 3. The treated fabric had a soft hand. The fabric was scoured for five minutes at about 90° C. in water containing an ether-alcohol sulfate detergent ("Duponol" RA, Du Pont). It was dried, agitated for five minutes at 50° C. in tetrachloroethylene, and redried. The fabric was evaluated for wettability by Spray Rating Test Method 22-1967 of AATCC. Spray rating was 50.

The preceding representative examples can be varied within the scope of the present total specification disclosure, as understood and practiced by one skilled in the art, to achieve essentially the same results.

As many apparently widely different embodiments of this invention can be made without departing from the spirit and scope thereof, it is to be understood that this invention is not limited to the specific embodiments thereof except as defined in the appended claims.

We claim:

1. The process or treating water swellable cellulosic materials with a preformed flame retarding biocidal, ultraviolet light absorbing fluorescent brightener or water proofing treating agent which process comprises contacting said cellulosic material in any sequence with:
   1. water in an amount sufficient to swell the cellulose;
   2. at least an effective amount of at least one of said agents, said agent having a solubility in boiling water in grams per liter of less than 5 percent of said amount contacted; and
   3. a solvent in an amount sufficient to maintain swelling of the cellulose if water is removed, and which
      a. is at least 2.5 weight percent soluble in water at 25° C.,
      b. boils above about 150° C. at atmospheric pressure,
      c. is a solvent for the agent at some temperature in the range of about 0° to 225° C., and
      d. has the formula

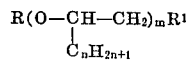

or

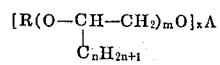

wherein
$n$ is 0 or 1;
$m$ is a positive whole number;
R is H, $C_{1-8}$ alkyl, $C_{7-15}$ aralkyl or alkaryl,

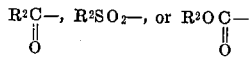

wherein
$R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$R^1$ is -OH, $-OR^2$, $-SR^2$, $-NHR^2$, $-NR^2(C_{1-8}$ alkyl), $-NR^2(C_{7-15}$ aralkyl or alkaryl),

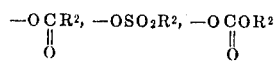

-NH(phenyl), or -NH(naphthyl);
$x$ is the number of unsatisfied valencies in A; and
A is $ROCH_2CHORCH_2-$, $-CH_2CHORCH_2-$,

$-CH_2C(CH_2OR)_3$, $(-CH_2)_2C(CH_2OR)_2$, $(-CH_2)_3CCH_2OR$, $(-CH_2)_4C$, $-CH_2(CHOR)_yCH_2OR$, $-CH_2(CHOR)_yCH_2-$, or $-CH_2(CHOR)_{y-z}(-CH)_zCH_2-$ in which y is 2, 3, or 4 and z is 0, 1, 2, 3, or 4 but no greater than y;

provided that at some stage during the process the interior of the swollen cellulose is contacted with a solution of the agent in aqueous solvent or solvent, and recovering treated cellulosic material which has said preformed treating agent distributed throughout and which is fast to aqueous washing and/or drycleaning with organic solvents after removal of any residual treating agent from the surface of the material by scour.

2. The process of claim 1 wherein the interior of the swollen cellulose is contacted with a solution of agent in aqueous solvent or solvent, said solution being obtained by reducing the proportion of water to solvent.

3. The process of claim 1 wherein the interior of the swollen cellulose is contacted with a solution of agent in aqueous solvent or solvent, said solution being obtained by adding an auxiliary solvent which is a halogenated hydrocarbon having an atmospheric pressure boiling point of less than about 130° C.

4. The process of claim 1 wherein the cellulosic material, after treating, is scoured with an aqueous detergent solution.

5. The process of claim 1 wherein the cellulosic material is cotton, regenerated cellulose or wood pulp and the interior of the swollen cellulose is contacted with a solution of agent in aqueous solvent or solvent at an elevated temperature.

6. The process of claim 5 wherein there is applied to the cellulosic material sufficient water and solvent to provide at least about 10 weight percent water and about 3 to 60 weight percent solvent, based on the dry weight of cellulosic material, wherein the solvent has the formula

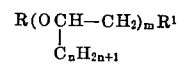

and wherein $n$ is 0.

7. The process of claim 6 wherein the water, solvent and agent are contacted with the cellulosic material in at least two steps.

8. The process of claim 7 wherein water and solvent are contacted with the cellulosic material in one step, agent is contacted with the cellulosic material in another step, and the swollen cellulose is contacted with said solution of the agent at 125° to 225° C.

9. The process of claim 8 wherein the cellulosic material, after treating, is scoured with an aqueous detergent solution.

10. The process of claim 6 wherein the solvent is completely miscible with water at 25° C.

11. The process of claim 6 wherein $m$ is 5 to 20, R is H and $R^1$ is -OH or $-OCH_3$.

12. The process of claim 5 wherein cotton fibers are:
   A. impregnated in an agent padbath mixture comprising
      1. about 10 to 95 weight percent water and
      2. about 5 to 90 weight percent of said solvent; and
   B. heated to 125° to 225° C.

13. The process of claim 12 wherein the cotton, after treating, is scoured with an aqueous detergent solution.

14. The process of claim 12 wherein the cotton is mixed or blended with a polyester fiber and the impregnated fibers are heated to 180° to 225° C.

15. The process of claim 14 wherein the mixture or blend, after treating, is scoured with an aqueous detergent solution.

16. The process of claim 5 wherein the elevated temperature is obtained by means of superheated steam.

17. The process of claim 5 wherein the agent is a biocide or ultraviolet light absorbing agent having a solubility in boiling water of less than 0.05 gram per liter.

18. The process of claim 5 wherein the agent is a fluorescent brightener having a solubility in boiling water of less than 0.005 gram per liter.

19. The process of claim 5 wherein the agent is a water proofing agent having a solubility in boiling water of less than 0.75 gram per liter.

20. The process of claim 6 wherein the agent is a flame retarding agent having a solubility in boiling water of less than 1.75 grams per liter.

21. The process of claim 20 wherein the flame retarding agent is a phosphorus-containing compound.

22. The process of claim 21 wherein the flame retarding agent is a bromine- or nitrogen-containing compound.

23. The process of claim 20 wherein cotton fibers are:
A. impregnated with an agent padbath mixture comprising
 1. about 10 to 95 weight percent water and
 2. about 5 to 90 weight percent of said solvent; and
B. heated to 125° to 225° C.

24. The process of claim 23 wherein $m$ is 5 to 20, R is H and $R^1$ is -OH or -$OCH_3$.

25. The process of claim 23 wherein the cotton, after treating, is scoured with an aqueous detergent solution.

* * * * *